United States Patent Office 2,948,751
Patented Aug. 9, 1960

2,948,751

PREPARATION OF ORGANO-BORON COMPOUNDS

Robert J. Brotherton, Fullerton, Calif., assignor to United States Borax & Chemical Corporation, Los Angeles, Calif., a corporation of Nevada No Drawing. Filed Aug. 8, 1958, Ser. No. 753,866

1 Claim. (Cl. 260—551)

This invention relates as indicated to the preparation of organo-boron compounds and has particular reference to a method for preparing 5H,12H,19H-tris(benzo-1,3,2-diazaborolo)borazine and substituted 5H,12H,19H-tris (benzo-1,3,2-diazaborolo)borazine. These compounds will be found to have particular utility as fuel additives and rocket fuels.

It is therefore the principal object of the present invention to provide a new method for the preparation of 5H,12H,19H-tris(benzo-1,3,2 - diazaborolo)borazine and substituted 5H,12H,19H - tris(benzo - 1,3,2-diazaborolo) borazine.

Other objects will appear as the description proceeds.

To the accomplishment of the foregoing and related ends, said invention then comprises the features hereinafter fully described and particularly pointed out in the claim, the following description setting forth in detail certain illustrative embodiments of the invention, these being indicative, however, of but a few of the various ways in which the principle of the invention may be employed.

Broadly stated, the present invention provides the method of producing 5H,12H,19H-tris(benzo-1,3,2-diazaborolo)borazine and substituted 5H,12H,19H - tris (benzo-1,3,2-diazaborolo)borazine which comprises reacting a boric acid ester with an o-phenylenediamine having the general formula

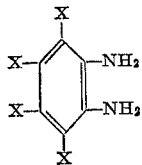

wherein X is a substituent selected from the group consisting of hydrogen radicals, alkyl radicals having from 1–5 carbon atoms, alkoxy radicals having from 1–5 carbon atoms, and halogen radicals; followed by isolation of 5H, 12H,19H-tris(benzo - 1,3,2 - diazaborolo)borazine and substituted 5H,12H,19H - tris(benzo - 1,3,2-diazaborolo) borazine from the resultant reaction.

It will be clearly understood that the substituents on the o-phenylenediamine may all be the same or all different, and the o-phenylenediamine may be substituted in any one, or all, or any combination of the 3, 4, 5 and 6 positions.

5H,12H,19H - tris(benzo - 1,3,2-diazaborolo)borazine and substituted 5H,12H,19H - tris(benzo - 1,3,2-diazaborolo)borazine are conveniently prepared by the present invention by heating a boric acid ester with an o-phenylenediamine. The reaction may be conducted with equimolar quantities of ingredients or excess of the boric acid ester in the presence or absence of reaction solvents. The following equation is a typical example of the mechanism of the present invention:

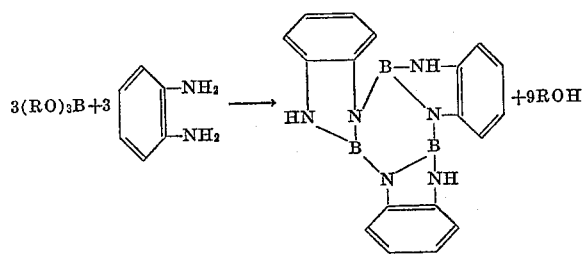

So that the present invention is more clearly understood, the following examples are given for illustrative purposes.

I. Equimolar amounts of isopropyl borate and o-phenylenediamine were placed in a three-necked flask connected to a distillation column. The mixture was heated at about 150° C. for about 18 hours, at which time about 2.81 moles (3.0 moles theoretical) of isopropanol was evolved. The reaction mixture was allowed to cool to room temperature and then filtered. The resulting solid was then washed with 20–40° petroleum ether. The solid was then ground in a mortar and rewashed with 20–40° petroleum ether. The rewashed material was then crystallized from dry acetone to give a white powder which decomposed at 350–390° C. in a sealed capillary tube. The boron content was 9.33% which is identical with theory for the compound $(C_6H_5N_2B)_3$. The theoretical molecular weight of the trimer $(C_6H_5N_2B)_3$ is 348. Cryoscopic molecular weight determinations of the product of this reaction showed the material to have a molecular weight substantially the same as the theoretical molecular weight. The material can also be recrystallized with dioxane and cyclohexanone. The product is insoluble in benzene and ethyl ether, partially soluble in diglyme, dioxane, acetone or cyclohexanone and soluble in dimethylformamide.

II. Example I was repeated using ethyl borate instead of isopropyl borate. The resultant product was the same $(C_6H_5N_2B)_3$ as isolated from the reaction of o-phenylenediamine and isopropyl borate.

Other modes of applying the principle of the invention may be employed, change being made as regards the details described, provided the features stated in the following claim or the equivalent of such be employed.

I, therefore, particularly point out and distinctly claim as my invention:

The method of producing a 5H,12H,19H-tris(benzo-1,3,2-diazaborolo)borazine which comprises heating under reflux a boric acid ester selected from the group consisting of isopropyl borate and ethyl borate with o-phenylenediamine having the general formula

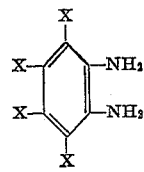

where X is a substituent selected from the group consisting of hydrogen, alkyl radicals having from 1–5 carbon atoms, alkoxy radicals having from 1–5 carbon and halogen radicals, allowing the reaction mass to cool to about ambient temperature and crystallizing the borazine from the reaction mass.

References Cited in the file of this patent

Urs et al.: Journal of the American Chemical Society, vol. 74, p. 2948 (1952).

Goubeau: Zeitschrift für Anorganische und Allgemeine Chemie, vol. 268, p. 146 (1952).

Goubeau: Zeitschrift für Anorganische und Allgemeine Chemie, vol. 266, p. 164 (1951).